United States Patent [19]
Frost et al.

[11] 3,817,386
[45] June 18, 1974

[54] REVERSE OSMOSIS MEMBRANES FROM PYRRONE POLYMER PRECURSORS

[75] Inventors: Lawrence W. Frost, Murrysville; Pang-Kai Lee, Pittsburgh, both of Pa.

[73] Assignee: Westinghouse Electric Corporation, Pittsburgh, Pa.

[22] Filed: May 3, 1972

[21] Appl. No.: 249,999

[52] U.S. Cl.................. 210/321, 210/433, 210/500
[51] Int. Cl............................................. B01d 31/00
[58] Field of Search............ 210/23, 321, 490, 500, 210/433; 260/47 CP, 78 TF

[56] References Cited
UNITED STATES PATENTS

| | | | |
|---|---|---|---|
| 3,414,543 | 12/1968 | Paufler | 260/47 CP |
| 3,422,008 | 1/1969 | McLain | 210/321 X |
| 3,457,170 | 7/1969 | Havens | 210/321 X |
| 3,567,632 | 3/1971 | Richter et al. | 210/23 |
| 3,598,241 | 8/1971 | Vondracek et al. | 210/321 |
| 3,696,031 | 10/1972 | Credali et al. | 210/23 |

*Primary Examiner*—John Adee
*Assistant Examiner*—Robert H. Spitzer
*Attorney, Agent, or Firm*—D. P. Cillo

[57] ABSTRACT

A permselective polymeric membrane for use in a reverse osmosis system is prepared from nitrogen linked organic polymers, having pendant carboxyl and amino groups, of the formula:

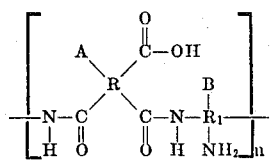

where A is a —H or —$CO_2H$ radical; B is a —H or —$NH_2$ radical; R and $R_1$ are tetravalent organic radicals in which the carboxyl or amino radical is alpha, ortho, or peri to one of the amide linkages; A or B is alpha, ortho, or peri to the other amide linkage; R contains at least two carbon atoms and $R_1$ contains at least four carbon atoms.

6 Claims, 2 Drawing Figures

REVERSE OSMOSIS MEMBRANES FROM PYRRONE POLYMER PRECURSORS

BACKGROUND OF THE INVENTION

This invention relates to polyamino-acid-amide polymers containing pendant carboxyl and amino groups, and supported permselective membranes made from such polymers and used in reverse osmosis systems. In particular it concerns polymeric intermediates in the synthesis of imidazopyrrolone polymers. These imidazopyrrolone polymers are formed, in one case, by heat curing the product of an aromatic dianhydride and an aromatic tetraamine reacted in a polar aprotic solvent, as described by Bell and Jewell, *J. Poly. Science.*, (A-1), vol. 5, pp. 3043–3060 (1967) and U.S. Pat. No. 3,414,543, and shown in simplified form below:

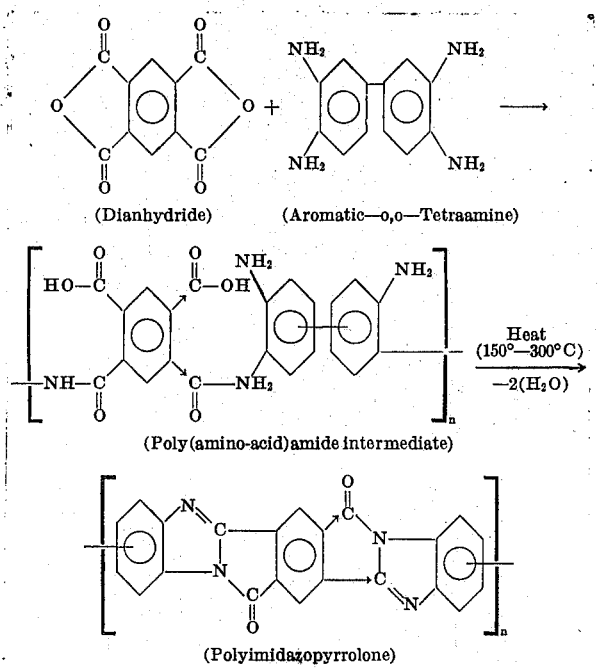

(Polyimidazopyrrolone)

The arrows indicate isomerism between the two positions shown. Polyimidazopyrrolone imide copolymers can also be formed by heat curing the product of an aromatic dianhydride and an aromatic triamine reacted in a polar aprotic solvent, as described in *Polymer Letters*, vol. 6, pp. 49–52 (1968), and shown in simplified form below:

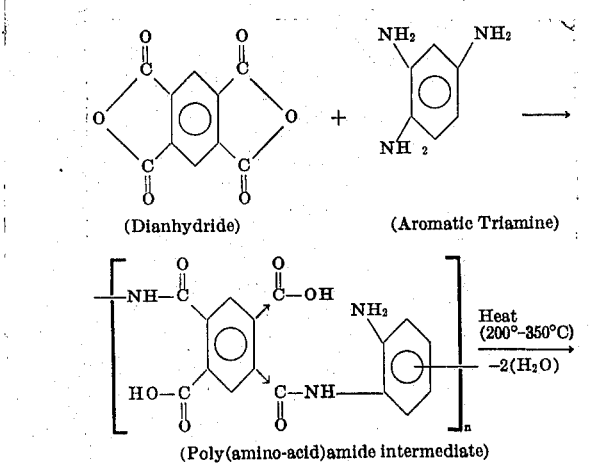

(Poly(amino-acid)amide intermediate)

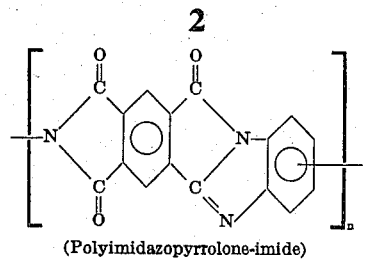

(Polyimidazopyrrolone-imide)

These polyimidazopyrrolone copolymers have been used as molding powders, cured impregnants in glass and fabric laminates, cured high temperature wire enamels and cured high temperature films, useful for electrical insulating purposes.

Richter in U.S. Pat. No. 3,567,632, teaches permselective nitrogen linked aromatic polymeric membranes. Richter teaches inclusion of pendant ionic groups, such as sulfonate, carboxylate, phosphate, ammonium and phosphonium on the aromatic constituents of his polymers to increase the water flux of his membranes. Richter sets an upper limit of 1 pendant ionic group per 500 units of polymer molecular weight, with more pendant ionic groups he finds the salt rejection of his membranes unacceptable. The aromatic constituents are generally described by Richter as divalent organic radicals, only a very small and critical percent of which contain pendant ionic groups. Examples of some of the simplest Richter permselective polymers include:

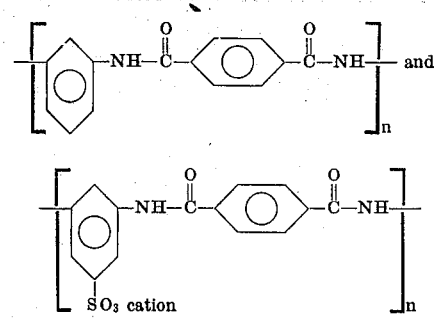

Richter's polymers are cast as films from a solution containing an inorganic salt, and then partially dried to form a protomembrane. The protomembrane is then leached in ice water to provide an asymmetric membrane having a dense skin overlying a porous structure.

SUMMARY OF THE INVENTION

Applicants have provided permselective nitrogen linked organic polymeric membranes which are uniform in cross section. Applicants' membranes include carboxyl groups pendant on R constituents of the polymer and amino groups pendant on the $R_1$ constituents, as shown below. In terms of a structural formula, the polymers of applicants' permselective membrane may be represented as follows:

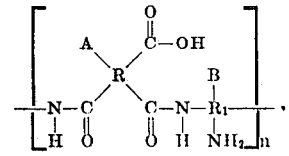

where A is a monovalent radical selected from the group consisting of —H and —$CO_2H$; B is a monovalent radical selected from the group consisting of —H and —$NH_2$; R and $R_1$ are tetravalent organic radicals in which the —$CO_2H$ (carboxyl) or —$NH_2$ (amino) radical is alpha, ortho, or peri to one of the amide linkages; A or B is alpha, ortho, or peri to the other amide linkage; R contains at least two carbon atoms and $R_1$ contains at least four carbon atoms.

BRIEF DESCRIPTION OF THE DRAWINGS

For a better understanding of the invention, reference may be made to the preferred embodiments exemplary of the invention, shown in the accompanying drawings, in which.

DESCRIPTION OF THE PREFERRED EMBODIMENTS

The basic concept of the present invention is to provide a modified poly(amino-acid-amide) casting solution, which can be cast to provide a membrane useful for reverse osmosis water purification application. This polymer membrane contains a high concentration of hydrophilic carboxyl and amino groups. The high concentration of hydrophilic groups in the polymer membrane of this invention provides excellent reverse osmosis performance when the membrane is properly prepared.

Osmosis occurs when two solutions of different concentrations in the same solvent are separated from one another by a membrane. If the membrane is ideally semi-permeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process.

Figure 1:
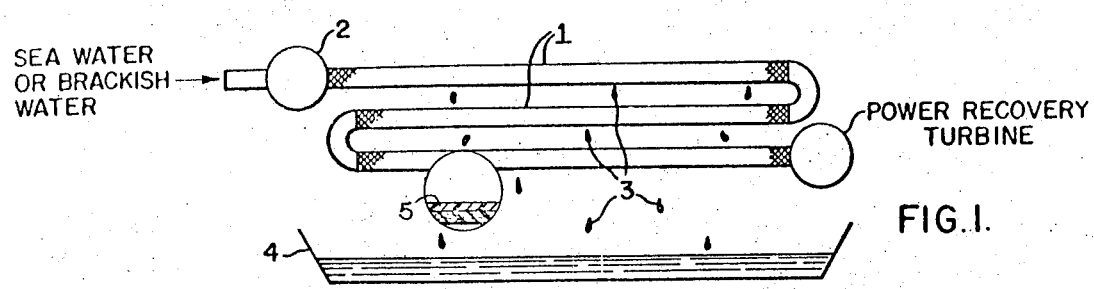
FIG. 1 is a diagram showing the principle for extracting fresh water from sea or contaminated water by a reverse osmosis liquid treatment system containing a supported membrane, feed inlet means and treated liquid outlet means.

The drawing of FIG. 1 illustrates a typical tubular-type reverse osmosis system. Sea water or contaminated water is pumped through a battery of support tubes 1. The pump 2 can operate as high as 1,500 p.s.i. The tubes can be mounted in batteries of about 150 each. They serve to support the reverse osmosis membrane 5 contained within the tube wall. The tube may be made of a variety of materials such as porous fiber glass or perforated stainless steel. The preferred porous tubular support is made from epoxy or phenolic resin bonded filler particles, such as sand, as described in U.S. Pat. No. 3,598,241. Of course, flat plate type reverse osmosis modules, which are well known in the art, can be used to support the membranes of this invention. The tube walls that support the reverse osmosis membranes must be able to withstand the pressure exerted on them by the pump and must be able to allow egress of the pure water 3 into a collecting pan 4. For sea water several passes through a system of this type may be required before the water is usable.

Figure 2:
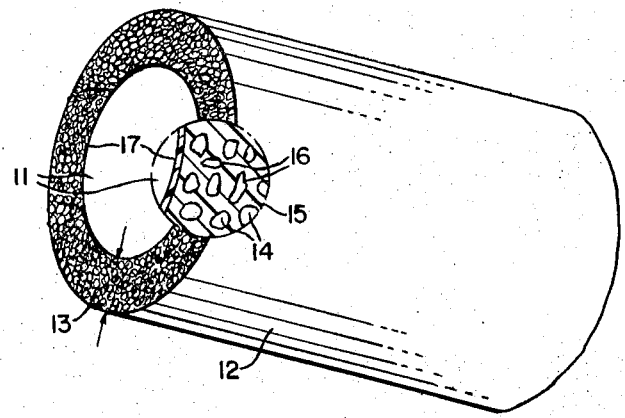
FIG. 2 is a three dimensional cross-sectional view of one embodiment of a reverse osmosis membrane support tube, showing the membrane supported by the inside tube walls.

FIG. 2 shows the preferred reverse osmosis membrane support tube as 10, containing feed water passageway 11. The tube wall 12 of thickness 13 comprises bonded filler 14 coated with an organic resin film 15 which bonds the filler together. The tube 10 contains voids or pores 16 between the resin coated filler particles, allowing egress of the pure water which has passed through the reverse osmosis membrane of this invention 17 supported by the inside of the tube walls. The area and number of the voids will vary inversely with the amount of resin and catalyst that is coated onto the filler particles. The resin which on curing bonds adjacent filler particles can be selected from the group consisting of epoxy resins, phenolic resins, polyester resins and melamine-formaldehyde resins. The filler may be spherical, oval or of irregular shape and can be sand, zircon, quartz or other granular fillers having an average particle size range between about 40 and 500 microns. Below 40 microns and the resin-filler support tube lacks the desired porosity and above 500 microns the tube does not properly support the membrane. The weight percent resin that can be used will vary from about 1 to 18 weight percent of the coated filler particle weight. Above 18 weight percent resin and the pores will clog while below 1 weight percent resin and the tube will be too weak for pressure required in reverse osmosis application.

Applicants' permselective membrane comprises polymers which may be represented by the following structural formula:

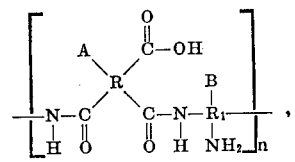

where n is an integer between 1–1,000; A is a monovalent radical selected from the group consisting of —H and —$CO_2H$; B is a monovalent radical selected from the group consisting of —H and —$NH_2$; R and $R_1$ are tetravalent organic radicals in which the pendant —$CO_2H$ (carboxyl) or —$NH_2$ (amino) radical is alpha, ortho, or peri to one of the amide (—CONH—) linkages; A or B is alpha, ortho, or peri to the other amide linkage; R contains at least two carbon atoms and $R_1$ contains at least four carbon atoms. Preferably, R and $R_1$ are tetravalent organic cyclic radicals selected from the group consisting of:

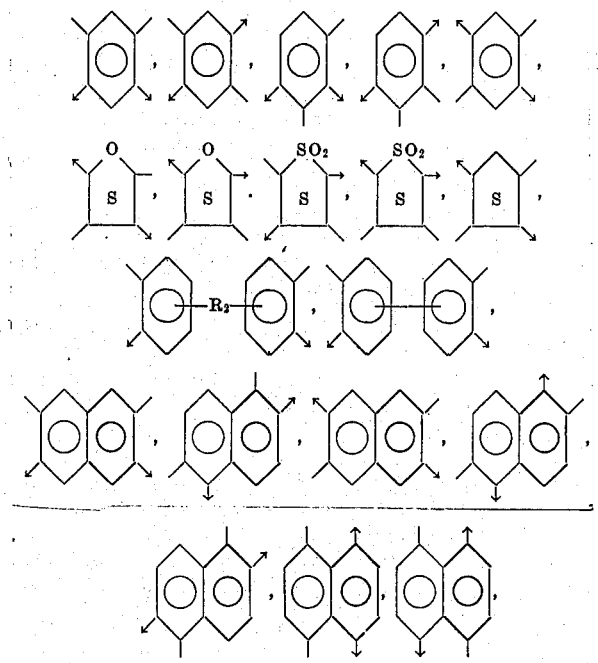

wherein the two amide linkages are not adjacent to each other, $R_2$ being selected from the group consisting of divalent aliphatic hydrocarbon radicals having from one to four carbon atoms and carbonyl, oxy, thio, amido, and sulfonyl radicals, and wherein the symbol → (arrow) indicates a chemical bond to an amide linkage (—CONH—) and the symbol — (line) indicates a chemical bond to a radical selected from the group consisting of —CO$_2$H, —NH$_2$, —A or —B. A small amount of self ionization may take place between the carboxyl and amino groups on the polymer.

When an anhydride reacts with an amine the carboxyl group produced will be located adjacent to the amide linkage. We prefer to have residual free —NH$_2$ groups adjacent to amide links —CONH—, because they are thereby deactivated and there is less of a problem with cross-linking, i.e., the —NH$_2$ groups are deactivated by ortho amide links and resist further reaction with dianhydride to give an insoluble crosslinked product. If amide links are adjacent on a ring structure it would be difficult to obtain the preferred high molecular weight polymers.

The reverse osmosis membranes of this invention are formed by reacting a dianhydride with a suitable tetraamine or triamine in a polar aprotic solvent, to form a polyamino-acid-amide casting solution, casting the solution, and evaporating a portion of the solvent. Any dianhydride containing two cyclic anhydride groups is suitable for use in the present invention. Both five and six membered anhydride rings are useful. Dianhydrides known or contemplated to be particularly suitable are: 1,2,4,5-benzenetetracarboxylic dianhydride (PMDA), 3,4,3',4'-benzophenonetetracarboxylic dianhydride (BTDA), 2,3,6,7-naphthalene tetracarboxylic dianhydride, 1,2,5,6-naphthalene tetracarboxylic dianhydride, 1,8,4,5-naphthalene tetracarboxylic dianhydride, 3,4,3',4'-biphenyl tetracarboxylic dianhydride, 2,3,2',3'-biphenyl tetracarboxylic dianhydride, bis-(3,4-dicarboxyphenyl) methane dianhydride, 2,2-bis-(3,4-dicarboxyphenyl) propane dianhydride, 1,2,3,4-cyclopentane tetracarboxylic dianhydride, tetrahydrofurane-2,3,4,5-tetracarboxylic dianhydride, 1,2,5,6-hexane tetracarboxylic dianhydride, bis-(3,4-dicarboxyphenyl) sulfone dianhydride, bis-(3,4-dicarboxyphenyl) ether dianhydride, bicyclo [2,2,2]-octen-(7)2,3,5,6-tetracarboxylic dianhydride, perylene-3,4,9,10-tetracarboxylic dianhydride and mellophanic dianhydride. Useful compounds containing three functional carbonyl groups include trimellitic anhydride, trimellitic anhydride-4-acid chloride, bicyclo-[2,2,2]-octene-(7)-2,3,5-tricarboxylic acid-2,3-anhydride, and bicyclo-[2,2,2]-octene-(7-2,3,5-tricarboxylic acid-2,3-anhydride-5-acid chloride.

Suitable tetraamines or triamines for use in the synthesis of the reverse osmosis membranes of this invention may be represented by the following structural formula:

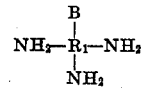

in which B is selected from the group consisting of —H or —NH$_2$ radicals; two amino radicals are alpha, ortho, or peri to each other; B is alpha, ortho, or peri to the remaining amino group; and $R_1$ is a tetravalent radical as heretofore described. Tetraamines and triamines known or contemplated to be particularly suitable are: 3,3'-diamino benzidine (DAB), 1,2,4,5-tetraaminobenzene, 1,2,4-triaminobenzene, 3,4,4'-triaminodiphenyl ether, 3,4,3'-triaminodiphenyl methane, 3-aminobenzidine, 3,4,3',4'-tetraamino benzophenone, 3,4,4', triaminobenzophenone, 3,4,4'-triaminodiphenyl sulfide, 3,4,3'-triaminodiphenyl sulfone, bis (3,4-diamino phenyl) methane, 1,2-bis (3,4-diamino phenyl) ethane, 2,2-bis (3,4-diamino phenyl) propane, bis (3,4-diamino phenyl) ether, bis-(3,4-diamino phenyl) sulfide, bis (3,4-diamino phenyl) sulfone, 2,3,6,7-tetraamino naphthalene and the corresponding fully ring-hydrogenated tetraamines and triamines.

Polar aprotic solvents that are useful in the synthesis of the reverse osmosis membranes of this invention are the normally liquid organic solvents of the N,N-dialkylcarboxyl-amide class. The preferred solvents are the lower molecular weight members of this class, particularly N,N-dimethylformamide (DMF) and N,N-dimethylacetamide (DMAC). Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide (DMSO), N-methyl-2-pyrrolidone (NMP), tetramethyl urea, pyridine, dimethylsulfone, hexamethylphosphoramide, tetramethylene sulfone, formamide, N-methylformamide and butyrolacetone. These solvents can be used alone, in combinations of solvents, or in combination with poor solvents such as benzene, benzonitrile, dioxane, xylene, toluene cyclohexane, acetone and ethanol.

Several polymerization reactions, to form the modified polyamino-acid-amide casting solutions of this invention are shown below in simplified form:

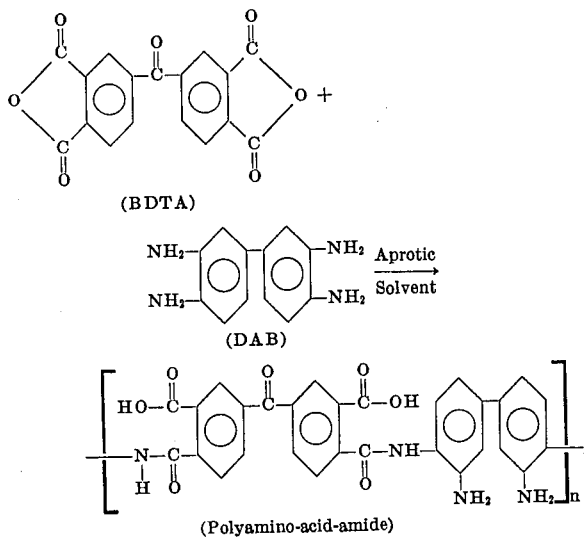

Only one chemical structure has been shown here for the repeating unit of the formed polymer, but actually 16 different isomeric configurations are possible, depending upon which way each of the anhydride rings opens and which member of each of the ortho pairs of amino groups reacts. All of the isomeric forms are useful in this application, and all of them are probably present in the polymer as normally prepared. Since the various configurations are believed to be distributed more or less randomly along each polymer chain, the total number of isomeric polymer molecules is extremely large. As can be seen from the polyamino-acid-amide structure shown above, the amide linkages are not adjacent to each other on the ring structure.

Other reactants can be substituted for all or part of the dianhydride (BTDA). For example, trimellitoyl anhydride chloride reacts with a tetraamine to give repeating structures of the type:

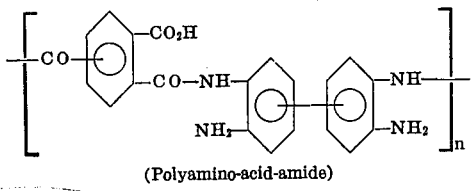

Other polyamines may also be substituted for all or part of the o, o-tetraamine reactant (DAB). For example, 1,2,4-triaminobenzene can be used to give such structures as:

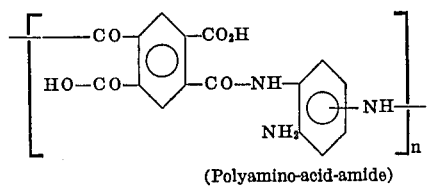

It is desirable to choose reactants and reaction conditions to minimize crosslinking reactions. Since the free amino groups shown in the preceding polymer structures are somewhat reactive toward anhydride groups, it is necessary to conduct the reactions in such a way that an excess of anhydride groups is avoided. Because of the deactivating effect of the ortho amide linkage, however, it is possible to prepare essentially linear high polymers from tetraamines containing two pairs of ortho diamino groups or from a triamine containing one ortho pair and one isolated amino group. If three or more isolated amino groups are present, as in 1,3,5-triaminobenzene, there is less deactivation of residual amino groups, and it becomes very difficult to avoid crosslinking and gelation.

The reaction must be conducted in a solvent for the polymer at temperatures of up to about 100°C, and preferably between about −10° to 80°C. Above 100°C reaction temperature it is difficult to prevent reaction of the second amino group of an ortho pair, and crosslinking with accompanying gelation may occur. The final reaction mixture can contain up to about 30 wt. percent solids content, and preferably between about 1–10 wt. percent solids content. Attempts to prepare solutions of over 30 wt. percent solids usually give a gelled product or a solution of extremely high viscosity.

Rapid agitation is necessary during addition of the dianhydride to the polyamine solution and a local excess of dianhydride must be avoided. This is accomplished by adding the last portion of the dianhydride as a solution, which is added dropwise to the rapidly stirred reaction mixture.

Films can be cast from the solution of the polymer by spreading the solution in a thin layer on a suitable substrate, such as a glass plate, by means of an appropriate doctor knife and removing part of the solvent at a moderate temperature. This can be done by vacuum treatment or by the use of a stream of air or other gas to evaporate the solvent, at a temperature up to about 100°C. Drying temperatures over about 100°C result in loss of the hydrophilic carboxyl and amino groups with resulting poor reverse osmosis characteristics. Preferably, the solvent is evaporated at between about 35°–75 C. The last of the solvent can be removed by leaching the film with water or other non-solvents such as liquid alcohols, esters, ethers, ketones, hydrocarbons and the like.

After evaporation of solvent, the permselective membrane is readily lifted from the glass plate by soaking the glass plate in 20°–90°C water. Preferably, the final polyamino-acid-amide reverse osmosis membrane will have a thickness between about 0.01–10 mils. Membranes over about 10 mils in thickness usually lack sufficient permeability to water for practical operation. At a thickness below 0.01 mil, there is difficulty in handling the membrane without damage, and salt rejection may be inadequate.

The final polyamino-acid-amide polymer, comprising the reverse osmosis membrane, will contain about one carboxyl radical and one amino radical per 270 units of polymer molecular weight for the BTDA + DAB polymer. The polymers of this invention will generally contain from about one carboxyl radical and one amino radical per 150–1,000 units of polymer molecular weight. The membrane will have a relatively uniform cross-section of polymer chains having outstanding thermal stability and superior chemical resistance and anti-compacting properties, as compared to standard cellulose acetate reverse osmosis membranes. They may be specifically applicable to treatment of certain hot waters or industrial waste waters where the present cellulose acetate membranes cannot be applied. Because they are substantially uniform throughout, they are not as easily damaged, as cellulose acetate membranes containing thin osmotic skins, and either side can be used against the high pressure in the reverse osmosis system.

EXAMPLE 1

A solution of 4.286 g (0.02 mole) of 3,3'-diaminobenzidine (DAB) in 129.4 of N,N-dimethylacetamide (DMAC) was stirred rapidly while adding a solution of 6.444 g (0.02 mole) of 3,3',4,4'-benzophenonetetracarboxylic dianhydride (BTDA) in 80.0 g of DMAC at room temperature. Approximately 80 percent of the solution was added within about 15 min. The remaining 20 percent was added at the rate of about one drop every 10 sec. The resulting solution was filtered to give a clear red-brown polyamic acid-amine (poly amino-acid amide) casting solution of moderate viscosity. This polymer solution, diluted as necessary, was cast on glass plates 10.5 cm × 10.5 cm in size with a doctor blade. As shown in Table 1, the ssolvent was evaporated at various temperatures and times on a hot plate. Membranes were formed which were separated from the glass plates by soaking the plates and membranes in hot water. The membranes were between 0.05 – 0.8 mils thick and had a substantially uniform cross section. They were kept immersed in water until put into the reverse osmosis test unit.

Reverse osmosis performance of the prepared membranes was tested in a standard stainless steel reverse osmosis membrane test unit, using round 5.08 cm dia. sections cut from the cast membranes. The test membranes were used against sodium chloride solution at a feed pressure of 600 p.s.i. and the brine circulation rate was 150 ml. per minute. The test results are summarized in Table 1 for membranes cast from 1% – 5% polymer solutions:

TABLE 1

Performance of DAB-BTDA polyamino-acid-amide membranes.
Feed concentration: 0.5% NaCl sol. (5,000 ppm) at room temp.
Feed pressure: 600 p.s.i.

| Casting Solution | Casting Conditions | Hours On Test — Membrane Side Facing Pressure | Salt Rejection % Initial – Final | Water Flux gal./sq. ft./day Initial – Final |
|---|---|---|---|---|
| No. 1 5% solids in DMAC | dried at 50°C for 20 hours; lifted in 50°C water; 0.8 mil. thick | 168 air evaporation side | 98.0–97.7 | 0.7–0.4 |
| No. 2 5% solids in DMAC | dried at 50°C for 3 hours; lifted in 80°C water; 0.4 mil. thick | 100 | 93.8–98.1 | 0.9–1.0 |
| No. 3 5% solids in DMAC | dried at 50°C for 1 hour; lifted in 60°C water; 0.2 mil. thick | 90 glass cast side | 99.0–99.2 | 0.47–0.51 |
| No. 4 5% solids in DMAC | dried at 50°C for 1 hour; lifted in 60°C water; 0.2 mil. thick | 90 air evaporation side | 98.0–99.0 | 0.98–1.1 |
| No. 5 2% solids in DMAC | dried at 50°C for 1 hour; lifted in 60°C water; 0.1 mil. thick | 95 air evaporation side | 98.3–98.7 | 0.67–0.68 |
| No. 6 2% solids in DMAC | dried at 25°C for 15 hours; lifted in 25°C water; 0.05 mil. thick | 72 | 93.2–98.5 | 1.44–1.89 |
| No. 7 1% solids in DMAC | dried at 25°C for 15 hours; & 95°C for 3 min.; 0.1 mil. thick; lifted in 89°C water | 78 | 80.5–96.1 | 3.10–2.81 |
| No. 8 1% solids in DMAC | dried at 45°C for 1 hour; lifted in 78°C water; 0.05 mil. thick | 47 | 80.4–98.3 | 3.8–3.0 |

Feed concentration: 3.57% NaCl sol. (35,700 ppm) at room temp.
Feed pressure: 600 p.s.i.

| | | | | |
|---|---|---|---|---|
| No. 9 1% solids in DMAC | dried at 45°C for 1 hour; lifted in 78°C water; 0.5 mil. thick; previously tested for 386 hours against 0.5–1.96% NaCl sol. | 120 | 80.4–69.3 | 0.9–0.92 |
| No. 10 5% solids in DMAC | dried at 55°C for 1 hour; lifted in 25°C water; 0.1 mil. thick; previously tested for 24 hours against 1.96% NaCl sol. | 120 | 70.5–68.0 | 1.2–1.22 |

As can be seen, membrane No. 3 exhibited salt rejection efficiencies up to 99.2 percent for brackish water, which is comparable to that of cellulose acetate reverse osmosis membranes. While pure water flux rates obtained were below those of cellulose acetate, significant increases do appear possible, and the outstanding thermal stability, superior chemical resistance and anti-compaction properties of the membranes of this invention would make them more widely applicable than current cellulose acetate membranes.

The pure water flux rate of the prepared membrane was dependent upon membrane thickness, preferred membranes being 0.01–10 mils. thick. Unlike cellulose acetate membranes, the polyamino-acid-amine membranes of this invention appear to be symmetrical, as both the air evaporation side and the glass cast side of the membrane showed almost the same desalting behavior.

For sea water, a multiple stage treatment, where the membrane would be cast inside fine pored resin bonded sand or other type tubular modules, with sea water passing inside the series of tubes, may be required.

We claim:

1. A reverse osmosis liquid treatment system containing a supported membrane, feed inlet means and treated liquid outlet means, wherein the permselective polymeric reverse osmosis membrane consists essentially of nitrogen linked organic polymers, having a high concentration of pendant hydrophilic carboxyl and amino groups, represented by the formula:

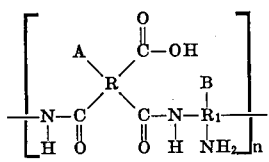

wherein n is an integer between 1–1,000; A is a monovalent radical selected from the group consisting of —H and —$CO_2H$; B is a monovalent radical selected from the group consisting of —H and —$NH_2$; R and $R_1$ are tetravelent organic radicals in which the pendant —$CO_2H$ or —$NH_2$ radical is alpha, ortho, or peri to one of the —CONH— linkages; A or B is alpha, ortho, or peri to the other amide linkage; R contains at least two carbon atoms and $R_1$ contains at least four carbon atoms, and wherein said membrane has a thickness between about 0.01–10 mils, a substantially uniform cross section, and is supported on a porous substrate.

2. The reverse osmosis system of claim 1 wherein, in the formula R and $R_1$ are selected from the group consisting of:

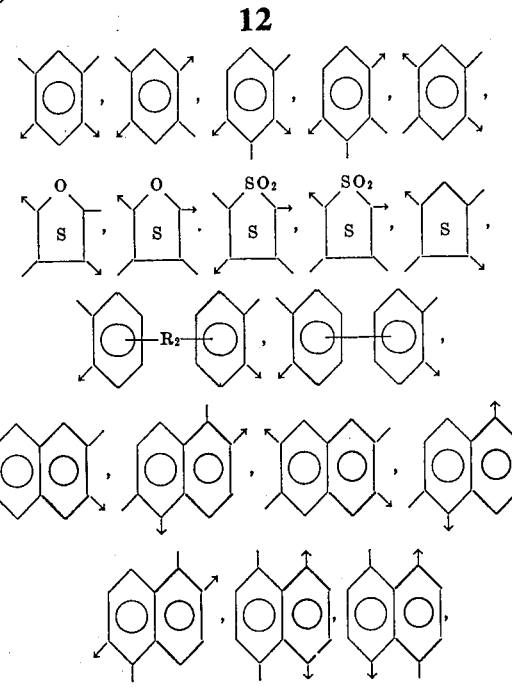

wherein the two amide linkages are not adjacent to each other, $R_2$ being selected from the group consisting of divalent aliphatic hydrocarbon radicals having from 1 to 4 carbon atoms and carbonyl, oxy, thio, amido, and sulfonyl radicals, and wherein the symbol (arrow) indicates a chemical bond to an amide linkage (—CONH—) and the symbol — (line) indicates a chemical bond to a radical selected from the group consisting of —$CO_2H$, $NH_2$, —A, and —B.

3. The reverse osmosis system of claim 2, wherein the membrane is a leached membrane and the polymer contains from about one carboxyl radical and one amino radical per 150–1,000 units of polymer molecular weight.

4. The reverse osmosis system of claim 2 wherein the membrane is contained within a porous support tube.

5. The reverse osmosis system of claim 2 wherein the membrane is contained within a porous support tube comprising resin bonded filler particles.

6. A reverse osmosis liquid treatment system containing a leached supported membrane, feed inlet means and treated liquid outlet means, wherein the permselective polymeric reverse osmosis membrane consists essentially of nitrogen linked organic polymers, having pendant carboxyl and amino groups, represented by the formula:

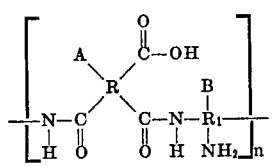

wherein n is an integer between 1–1,000; A is a monovalent radical selected from the group consisting of —H and —CO$_2$H; B is a monovalent radical selected from the group consisting of —H and —NH$_2$; R and R$_1$ are tetravalent organic radicals in which the pendant —CO$_2$H or —NH$_2$ radical is alpha, ortho, or peri to one of the —CONH— linkages; A or B is alpha, ortho, or peri to the other amide linkage; R contains at least two carbon atoms and R$_1$ contains at least four carbon atoms; the polymer contains from about one carboxyl radical and one amino radical per 150–1,000 units of polymer molecular weight, wherein said membrane has a thickness between about 0.01–10 mils and is supported within a porous support tube comprising resin bonded sand particles having an average particle size range between about 40–500 microns, said resin selected from the group consisting of epoxy resin, phenolic resin, polyester resin and melamine — formaldehyde resin, said resin constituting about 1–18 wt.% of the resin-sand particle weight.

* * * * *